(12) United States Patent
Draznin et al.

(10) Patent No.: US 9,374,681 B2
(45) Date of Patent: Jun. 21, 2016

(54) MOBILE DEVICE ORIGINATED MULTICAST BROADCASTING

(71) Applicant: Verizon Patent and Licensing Inc., Arlington, VA (US)

(72) Inventors: Sagiv Draznin, Walnut Creek, CA (US); Yee Sin Chan, San Jose, CA (US); Arda Aksu, Martinez, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 101 days.

(21) Appl. No.: 13/966,179

(22) Filed: Aug. 13, 2013

(65) Prior Publication Data

US 2015/0049661 A1 Feb. 19, 2015

(51) Int. Cl.
*H04H 20/71* (2008.01)
*H04W 4/06* (2009.01)
*H04W 4/00* (2009.01)
*H04W 76/00* (2009.01)

(52) U.S. Cl.
CPC ........ *H04W 4/06* (2013.01); *H04W 4/00* (2013.01); *H04W 76/002* (2013.01)

(58) Field of Classification Search
None
See application file for complete search history.

(56) References Cited

U.S. PATENT DOCUMENTS

| | | | |
|---|---|---|---|
| 2012/0136943 A1* | 5/2012 | Paul et al. | 709/206 |
| 2013/0194999 A1* | 8/2013 | Anchan | 370/312 |
| 2013/0246631 A1* | 9/2013 | Gonzales et al. | 709/227 |
| 2014/0192697 A1* | 7/2014 | Anchan et al. | 370/312 |

* cited by examiner

*Primary Examiner* — Kibrom T Hailu

(57) ABSTRACT

Content originated by a mobile device may be transmitted, via multicast, to one or more other mobile devices. In one implementation, a method may include receiving, from a mobile device attached to a wireless network, a request to initiate a multicast transmission of content generated by the mobile device. The method may further include determining one or more wireless coverage areas to which the multicast transmission of the content is to be provided; receiving, from the mobile device, a unicast transmission of the content; and distributing the received content, via one or more multicast data channels that are broadcast in the one or more wireless coverage areas.

20 Claims, 9 Drawing Sheets

US 9,374,681 B2

MOBILE DEVICE ORIGINATED MULTICAST BROADCASTING

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

One class of mobile wireless devices, such as smart phones and tablet (e.g., "pad") computing devices, may include mobile communication devices that are designed to provide additional functionality, such as the ability to execute a variety of general purpose computing applications. Video-related services, in particular, may be provided through these devices.

When providing content, such as video, over a wireless network, it may be important to intelligently deliver the content to the mobile devices to limit strain on the wireless network. One known technique for streaming video is known as multicast, in which a single channel may be used to broadcast content to multiple mobile devices. In contrast, with a unicast transmission, video streams transmitted to multiple mobile devices may require multiple channels that are each dedicated to a single mobile device.

A multicast system may include a number of multicast channels that are broadcast, over a radio interface, to interested mobile devices. For example, a content provider may make available a number of video streams, such as television streams, that may be transmitted as a multicast transmission. The content providers that are allowed to provide content, in a particular wireless network, may be selected ahead of time by the provider of the wireless network.

DETAILED DESCRIPTION OF PREFERRED EMBODIMENTS

The following detailed description refers to the accompanying drawings. The same reference numbers in different drawings may identify the same or similar elements.

As described herein, a Multimedia Broadcast Multicast Service (MBMS) may be provided, in which a first user (e.g., a subscriber) of a wireless network may upload content for multicast transmission. Other users may subscribe to the content uploaded by the first user. The other users may be notified, such as via a message, that content from the first user is available and is being transmitted via multicast. The other users may then choose to receive and view the multicast content. In other implementations, the content of the first user may be received and stored by the mobile devices associated with the other users. The content may be later viewed at the convenience of the other users. In one implementation, the MBMS service may include MBMS provided over a Long Term Evolution (LTE) network (eMBMS).

Figure 1:
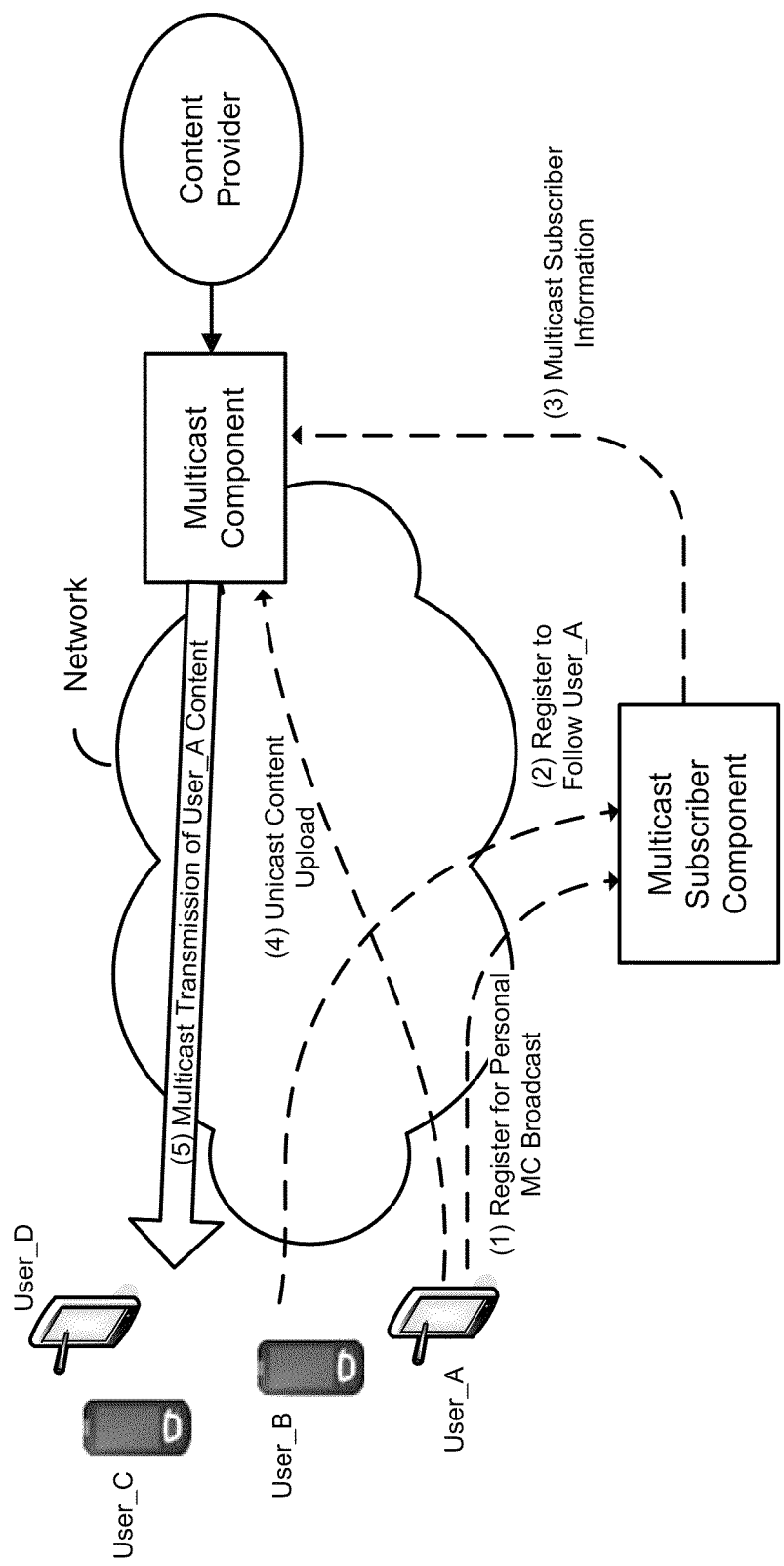
FIG. 1 is a diagram conceptually illustrating an example of an overview of concepts described herein.

FIG. 1 is a diagram conceptually illustrating an example of an overview of concepts described herein. As shown in FIG. 1, mobile devices (labeled as User_A, User_B, User_C, and User_D), such as smart phones, may obtain network connectivity from a network, such as a wireless network. The network connectivity may allow for a number of network services, such as voice services, unicast data services, and multicast data services (e.g., MBMS or eMBMS). The multicast services may be provided by a multicast component (e.g., network elements such as a broadcast multicast service center (BMSC), MBMS Gateway (MBMS GW)). A multicast subscriber component may also be included as a part of, or may be associated with, the network.

Consistent with aspects described herein, a user (e.g., User_A), associated with one of the mobile devices, may register for personal multicast broadcast services (communication (1), Register for Personal MC Broadcast). The user may indicate, for example, that the user is interested in uploading content for multicast transmission. The registration may be performed through the multicast subscriber component. At some point, other users, such as User_B, may indicate an interest in receiving the content of User_A (communication (2), Register to Follow User_A). The information relating to User_A and/or User_B may be uploaded or otherwise communicated to the multicast component (communication (3), Multicast Subscriber Information).

At some point, assume that User_A decides to upload content for multicast transmission. User_A may, for example, host a weekly video blog that the user would like to distribute via multicast or may otherwise decide to upload audio or video for multicast distribution to the subscribers of content provided by User_A. User_A may upload the content that is to be multicast, such as through a unicast upload through the network, to the multicast component. The multicast component may transmit the content, as a multicast transmission (e.g., via eMBMS), to one or more of the mobile devices (communication (5), Multicast Transmission of User_A Content). For example, the content may be transmitted to one or more sections (e.g., one or more wireless cells) of the network.

In the example of FIG. 1, assume that User_B and User_C have registered to follow content from User_A. User_B and User_C may receive a notification when the content from User_A is being transmitted. User_B and User_C may then choose whether to receive the multicast content. Alternatively or additionally, the multicast content may automatically (e.g., without first explicitly notifying User_B and User_C) be received and stored by the mobile devices associated with User_B and User_C, and potentially viewed (or, in the case of audio, listened to) at a later date. In this manner, the multicast subscriber component may enable a personal (i.e., mobile device-originated) multicast system.

Figure 2:
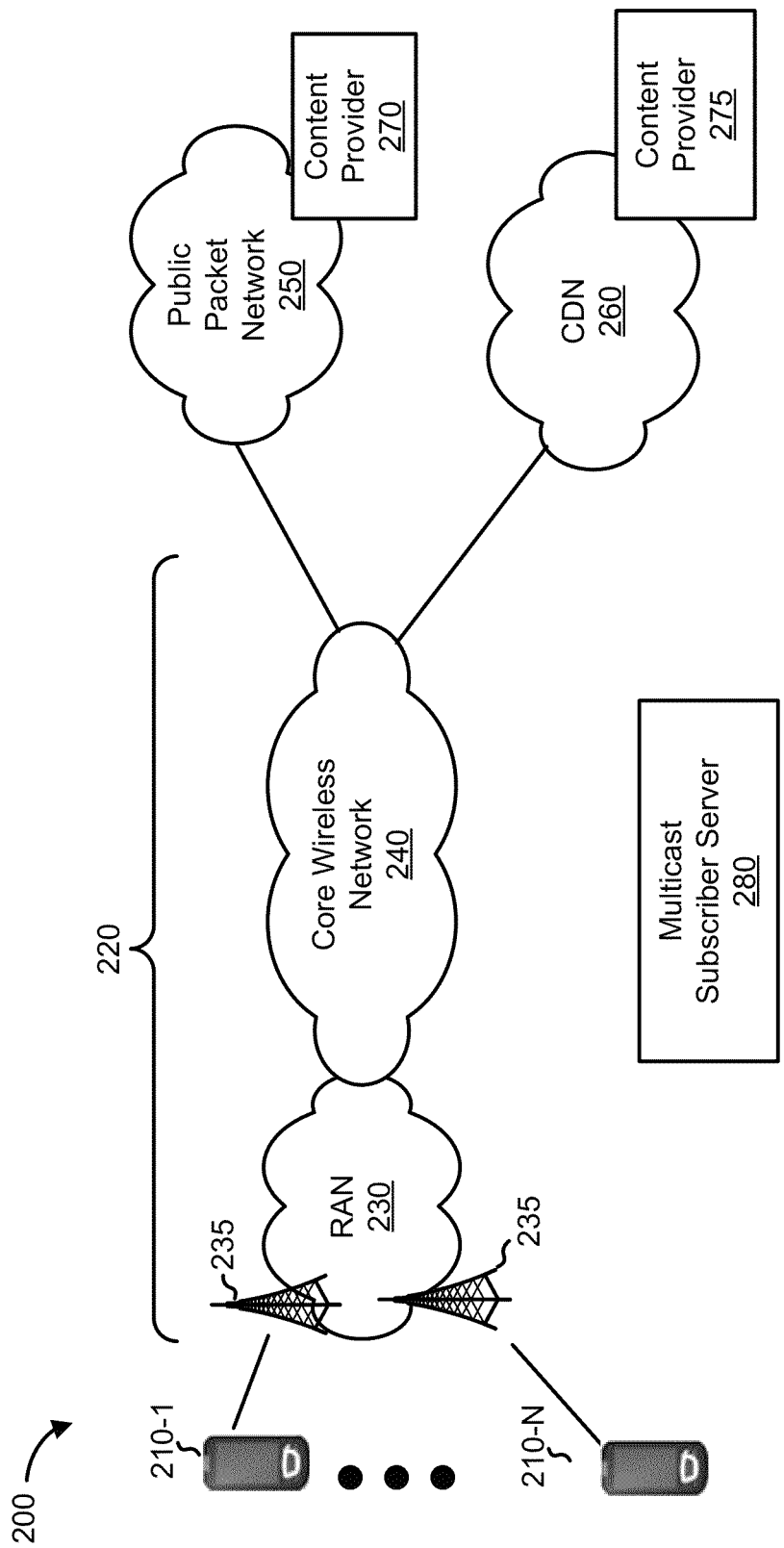
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210-1 through 210-N (referred to collectively as "mobile devices 210" or singularly as "mobile device 210"). Mobile devices 210 may obtain network connectivity through wireless network 220 (e.g., a cellular network). Wireless network 220, as illustrated, may include radio access network (RAN) 230 and wireless core network 240.

One or more additional networks, such as public packet network 250 and content delivery network (CDN) 260, may connect to wireless network 220. Content provider 270 may include one or more devices, such as content servers, that deliver content (e.g., streaming audio or video) to mobile devices 210. Content provider 275 may similarly include one or more devices, such as content servers, that deliver content to mobile devices 210. The content, from content provider 270 and/or content provider 275, may be delivered, over RAN 230, as multicast content.

Mobile devices 210 may include portable computing and communication devices, such as a personal digital assistant (PDA), a smart phone, a cellular phone, a laptop computer with connectivity to a cellular wireless network, a tablet computer, etc. Mobile devices 210 may also include non-portable computing devices, such as desktop computers, consumer or business appliances, set-top devices (STDs), or other devices that have the ability to connect to RAN 230. Mobile devices 210 may connect, through a radio link, to RAN 230. Through the radio link, mobile devices 210 may obtain data and/or voice services, such as content delivery services via which content (e.g., streaming video, streaming audio, or other content) may be delivered to mobile devices 210.

Figure 3:
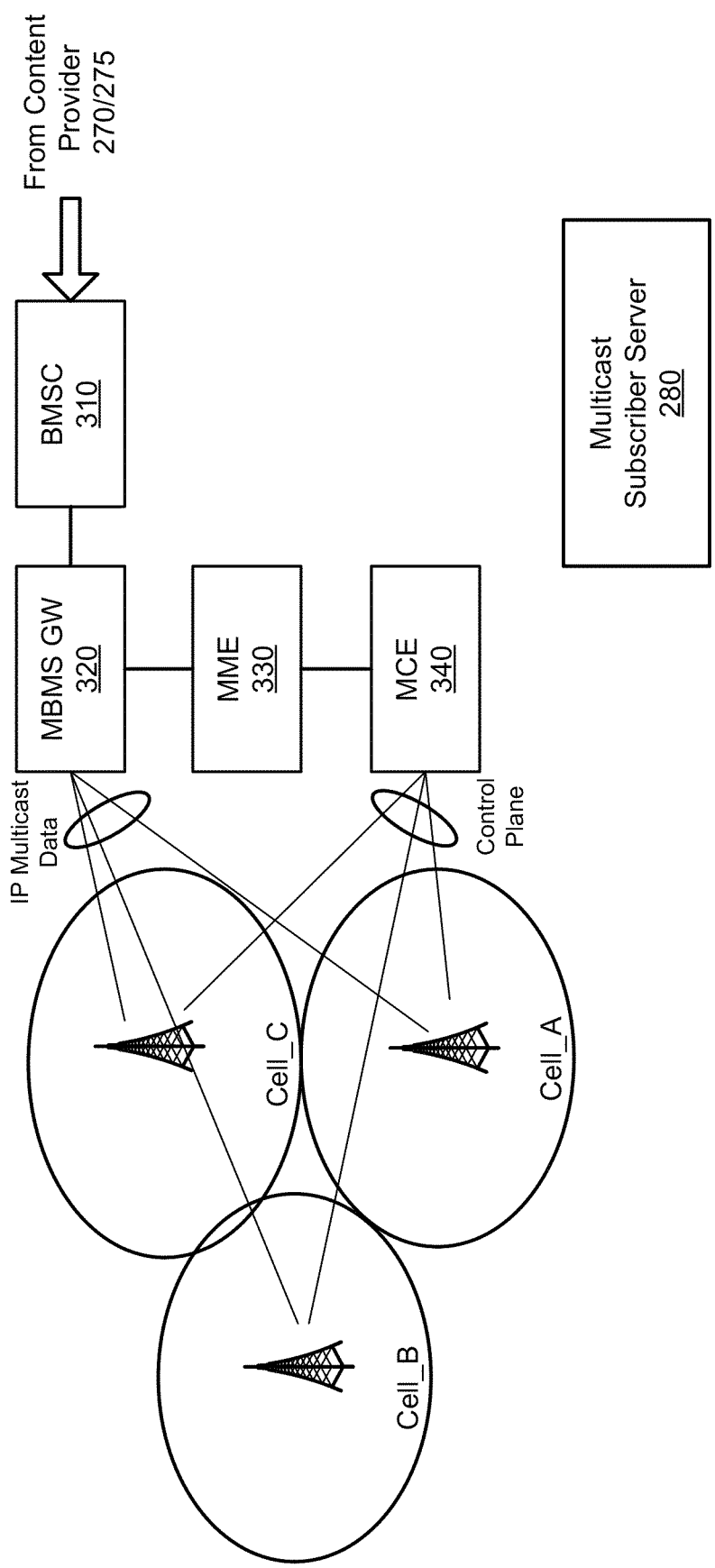
FIG. 3 is a diagram illustrating an example implementation of portions of the environment shown in FIG. 2.

RAN 230 may include one or more devices that include radio interfaces to provide wireless connections to mobile devices 210. RAN 230 may provide wireless connectivity for wireless network 220. RAN 230 may include, for example, one or more base stations 235. Each base station 235 may provide one or more radio interfaces over which the base station may communicate with mobile devices 210. The radio interfaces may include, for example, orthogonal frequency-division multiplexing (OFDM) and/or single-carrier frequency-division multiple access (SC-FDMA) based radio interfaces. In the context of a network such as a long term evolution (LTE) network (e.g., as illustrated in FIG. 3), base stations 235 may be referred to as evolved Node Bs (eNodeBs).

Core wireless network 240 may implement a network that provides routing, control, and data transmission services for mobile devices 210. Core wireless network 240 may connect to one or more other networks, such as to public packet network 250 and/or CDN 260, to provide network services to mobile devices 210. Core wireless network 240 may include one or more network devices used to implement control logic, physical links, and routing/switching functions that may be performed by core wireless network 240. In one implementation, core wireless network 240 may implement an LTE network.

Public packet network 250 may include one or more packet networks, such as an Internet Protocol (IP) based packet network. Public packet network 250 may include a wide area network (WAN), a local area network (LAN), and/or combinations of WANs and LANs. Mobile devices 210 may access public packet network 250 to obtain computation and/or data services from computing devices, such as from content provider 270.

CDN 260 may include one or more networks designed to provide content, such as streaming content delivered via multicast, to mobile devices 210. CDN 260 may include a wide area network (WAN), a local area network (LAN), and/or combinations of WANs and LANs.

Content providers 270 and 275 may each include one or more server devices that provide content, such as on-demand video content, to mobile devices 210. A content provider 270/275 may, for example, be an entity that has the rights to provide television content, other video content, radio content, etc. Content provider 270 may provide content, destined for mobile devices 210, via public packet network 250 and wireless network 220. Similarly, content provider 275 may provide content, destined for mobile devices 210, via CDN 260 and wireless network 220.

A multicast subscriber server 280 may perform functions relating to the providing of multicast services for mobile devices. Multicast subscriber server 280 may be implemented as part of wireless network 220 or may be implemented as part of another network, such as a packet data network connected to wireless network 220.

Multicast subscriber server 280 may include one or more computation and communication devices that operate to maintain information relating to subscribers of wireless network 220, such as users of mobile devices 210, that have registered for mobile device originated multicast transmissions. In some implementations, subscribers to network 220 may be required to register with multicast subscriber server 280 before being permitted to upload content that is to be multicast. For example, a subscriber may enable multicast content transmission by updating an account setting associated with the subscriber and agreeing to additional fees associated with the multicast service. In some implementations, multicast subscriber server 280 may also operate to maintain information relating to subscribers that register to receive multicast content. For example, a first subscriber may enable multicast content transmission, and other subscribers may register to receive multicast content from the first subscriber. Alternatively, or additionally, any mobile device 210 may be allowed to view content, provided via multicast, that is uploaded by the first subscriber. The operation of multicast subscriber server 280, in providing mobile device originated multicast content delivery, will be discussed in more detail below.

In some implementations, multicast subscriber server 280 may additionally operate to receive content from one of mobile devices 210, such as content received via a unicast transmission, and to forward the content to wireless network 220, for subsequent multicast transmission of the content by one or more base stations 235. In other implementations, content from a mobile device 210 may be transmitted to wireless network 220 without processing by multicast subscriber server 280.

FIG. 3 is a diagram illustrating an example implementation of portions of environment 200. In FIG. 3, elements of wireless network 220 may be particularly illustrated for an LTE network. In the context of an LTE network, multicast may be implemented as an eMBMS service. In other possible implementations, the functionality corresponding to the portions of environment 200 that are illustrated in FIG. 3 may be may be implemented based on other standards or technologies.

As shown in FIG. 3, an eMBMS service may be implemented using broadcast multicast service center (BMSC) 310, MBMS Gateway (MBMS GW) 320, Mobility Management Entity device (MME) 330, and Multi-cell/multicast Coordination Entity (MCE) 340. The eMBMS service may be provided to a number of wireless cells, labeled as Cell_A, Cell_B, and Cell_C.

BMSC 310 may include one or more computation or communication devices that provide for the coordination of multicast using eMBMS. BMSC 310 may perform functions relating to authorization, charging, and assignment of communication channels. For example, BMSC 310 may assign a particular number of multicast data channels for various multicast content streams. BMSC 310 may also receive content, such as from content provider 270/275, from multicast subscriber server 280, and/or from mobile devices 210. BMSC 310 may forward the received content as part of a multicast transmission. In some implementations, the functionality of multicast subscriber server 280 may be integrated within other network devices, such as BMSC 310.

MBMS GW 320 may include one or more computation or communication devices that provide for the coordination of the sending of multicast data (e.g., IP multicast packets) to base stations 235. MBMS GW 320 may receive the content, that is to be broadcast, from BMSC 310. As illustrated, MBMS GW 320 may transmit eMBMS data plane traffic ("IP Multicast Data") to base stations 235.

MME 330 may include one or more computation and communication devices that gather, process, search, store, and/or provide information in a manner described herein. For example, MME 320 may perform operations to register mobile devices 210 with the LTE network, to hand off mobile devices 210 from/to another network, and to perform policing operations on traffic destined for and/or received from mobile devices 210.

MCE 340 may include one or more computation or communication devices that may perform admission control, allocation of radio resources throughout a Multimedia Broadcast Multicast Service Single Frequency Network (MBSFN) area, MBMS session control signaling, and make decisions on radio configurations. As illustrated, MCE 340 may transmit eMBMS control plane traffic ("Control Plane") to base stations 235.

In eMBMS, cells associated with eNodeBs 235 may be grouped to obtain MBSFN areas. Multicast data channels in an MBSFN area may be synchronized so that identical multicast radio signals may be generated, at the same time, for multiple cells. For example, MBSFN areas may be defined that cover the area associated with multiple ones of the illustrated cells. For example, an MBSFN area may correspond to the area covered by Cell_A and Cell_B. A multicast data channel, transmitted in the MBSFN area, may include radio signals that are synchronized in Cell_A and Cell_B.

Although FIGS. 2 and 3 illustrate example components of environment 200, in other implementations, environment 200 may contain fewer components, different components, differently arranged components, or additional components than those depicted. Alternatively, or additionally, one or more components of environment 200 may perform one or more other tasks described as being performed by one or more other components of environment 200.

Figure 4:
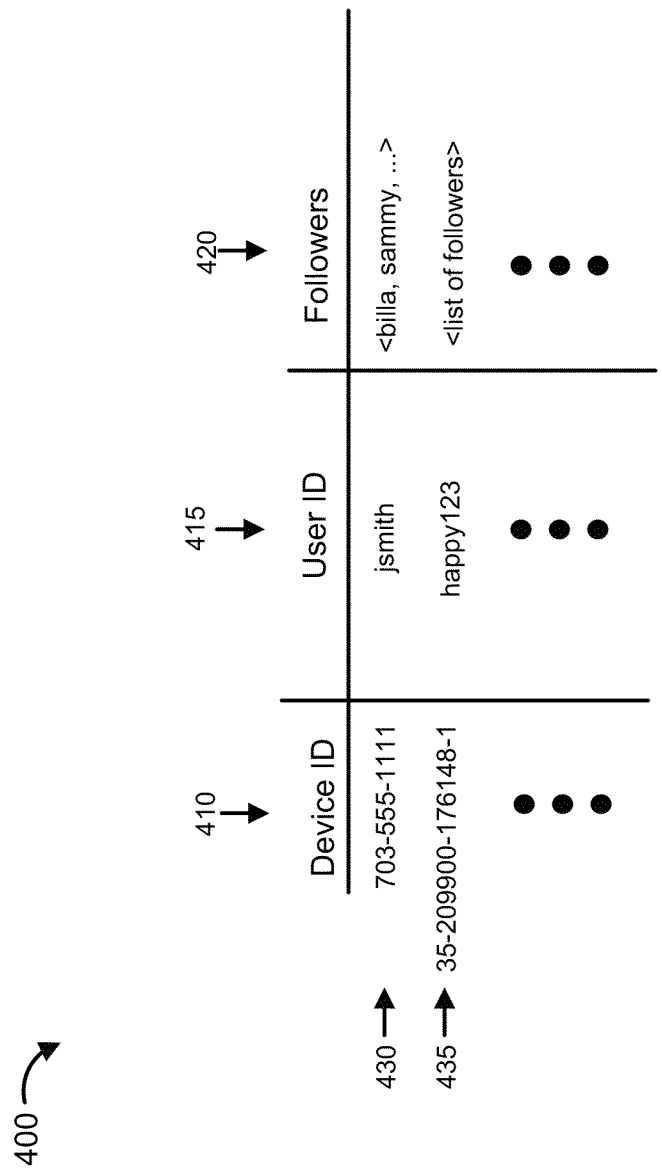
FIG. 4 is a diagram illustrating an example of data structures that may be maintained by the multicast subscriber server shown in FIG. 2.

As previously mentioned, multicast subscriber server 280 may maintain information relating to mobile device originated multicast transmissions. FIG. 4 is a diagram illustrating an example data structure 400 that may be maintained by multicast subscriber server 280. Data structure 400 may generally be used to store information relating to the users, of mobile devices 210, that are registered to submit content for multicast broadcasting. The fields shown in data structure 400 are examples. In alternative possible implementations, different, fewer, or additional fields may be implemented.

As illustrated, data structure 400 may include a number of fields, such as: device identification (ID) field 410, user identification (ID) field 415, and followers field 420. Device ID field 410 may include information that identifies a mobile device 210. Values of device ID field 410 may include, for example, mobile device telephone numbers, mobile device international mobile equipment identity (IMEI) values, a mobile equipment identifier (MEID), or another mobile device identifier.

User ID field 415 may include a user name (or another identifier) that is associated with the user that is interested in generating the content that is to be multicast. The user name may be the name that other subscribers use when registering to receive or be notified of content that is being multicast by a particular user. Followers field 420 may include an indication of the other subscribers, if any, that have registered to receive or be notified of the content that is being multicast by the particular user. Followers field 420 may include, for example, a list (or other data structure) that indicates users that have registered to receive the content that is being multicast.

Two example records are illustrated in data structure 400. Record 430 may be a record for the mobile device with the telephone number "703-555-1111" (device ID field 410) and associated with the user ID "jsmith" (user ID field 415). A number of other users may have registered to receive content generated by the user "jsmith," such as, as illustrated, the users "billa" and "sammy" (followers field 420). Record 435 may similarly correspond to a record for a user associated with a mobile device having the IMEI value "35-209900-176148-1" and with the user ID "happy123". The value in followers field 420 ("<list of followers>") may include a pointer to another data structure.

Figure 5:
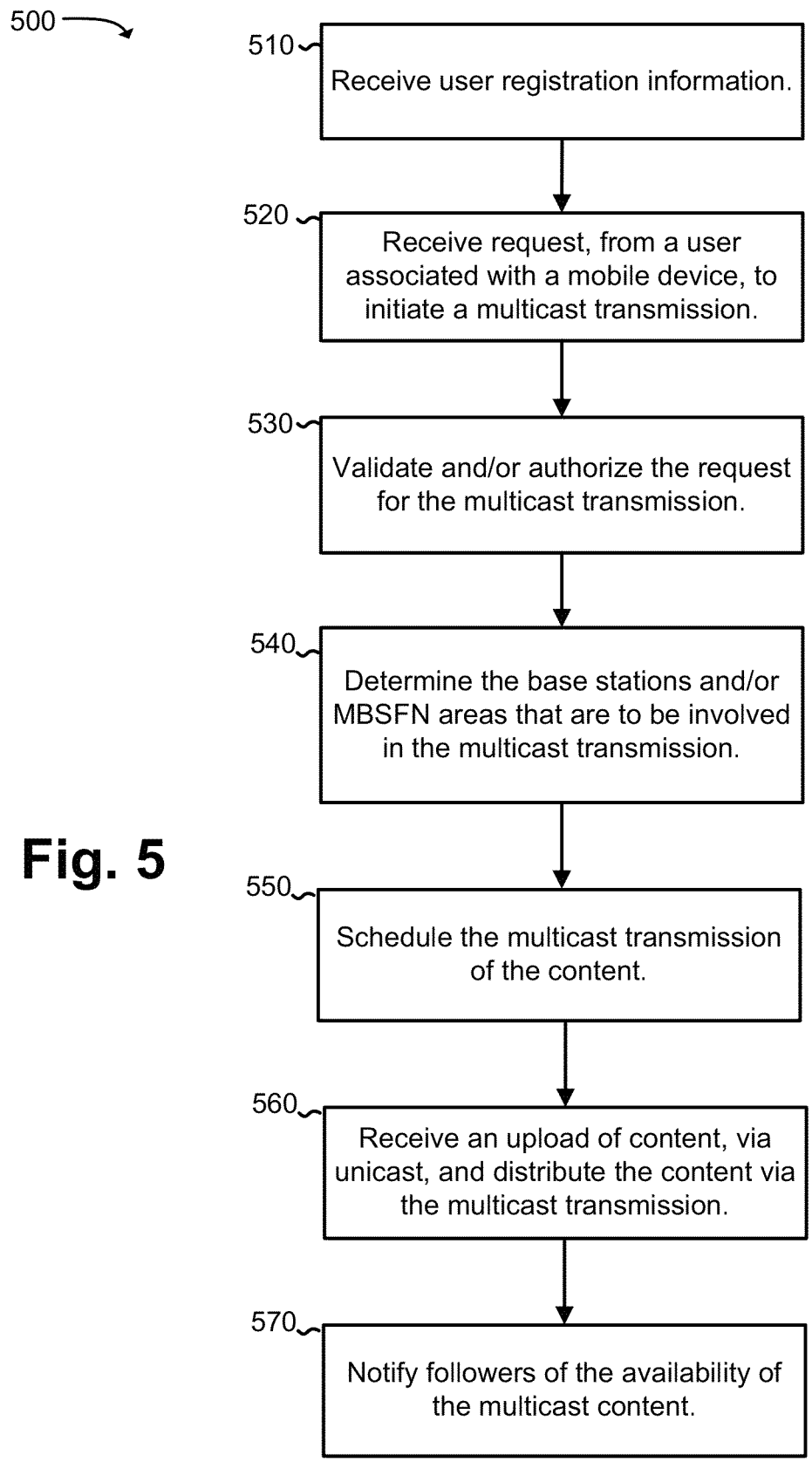
FIG. 5 is a flowchart illustrating an example process for providing multicast services using content provided by mobile devices.

FIG. 5 is a flowchart illustrating an example process 500 for providing multicast services using content provided by mobile devices. Process 500 may be performed, for example, by multicast subscriber server 280 and/or by one or more other devices, such as BMSC 310, MBMS GW 320, MME 330, and/or MCE 340.

Process 500 may include receiving user registration information (block 510). Users of mobile devices 210, who wish to receive and/or generate mobile device-provided multicast transmissions, may register with multicast subscriber server 280. For example, as illustrated in FIG. 4, multicast subscriber server 280 may maintain a data structure that stores information relating to the multicast broadcast, such as user IDs that are registered with the multicast service, and for each particular registered user, a list of other users that have registered to receive the multicast broadcasts of the particular registered user. In some implementations, users may be allowed to register as being interested in receiving multicast broadcasts, but not in generating multicast content.

In some implementations, the registration performed in block 510 may be omitted. In other words, users of mobile devices 210 may be allowed to participate in multicast broadcasts without first explicitly registering.

In situations in which the registration information is maintained by multicast subscriber server 280, multicast subscriber server 280 may, at certain times, transmit information to BMSC 310 (or to other devices involved in multicast broadcasting, such as MBMS GW 320 and/or MCE 340) to indicate which users (e.g., which mobile devices 210) are authorized to upload content for multicast broadcasting. Additionally, other information, such as charging information or restrictions relating to multicast transmission by a particular mobile device (e.g., am amount of allowed bandwidth, times during which multicast broadcasts may be allowed, geographical areas in which the multicast broadcast may be transmitted, etc.), may also be uploaded.

At some point, a registered user may desire to broadcast multicast content. For example, the user may initiate an application, on the user's mobile device, that is designed to receive video data from a camera of the mobile device and to upload the video data for multicast delivery. The mobile device may accordingly transmit a request to initiate a multicast broadcast. Process 500 may include receiving the request (e.g., from a mobile device) for the multicast transmission (block 520). In one implementation, the request may be received by multicast subscriber server 280. Alternatively or additionally, the request may be received by another network device, such as BMSC 310.

Process 500 may further include validating and/or authorizing the request for the multicast transmission (block 530). For example, multicast subscriber server 280 may determine whether an account associated with the mobile device (e.g., an account associated with a record in data structure 400), is authorized to originate content for a multicast transmission.

When the request for the multicast transmission is validated and/or authorized, process 500 may further include determining the base stations and/or MBSFN areas that are to be involved in the multicast transmission (block 540). In some implementations, the list of followers (e.g., from followers field 420) may be used to determine the areas in which the content will be multicast transmission. For example, each MBSFN area that includes an attached mobile device, associated with at least one follower, may be scheduled for the multicast transmission. As another example, an MBSFN area may be selected for multicast transmission of the content only when a threshold number of followers (e.g., two or more) are associated with the MBSFN area. As another example, the user initiating the multicast transmission may indicate an area, such as a geographic area, in which the multicast transmission is relevant. For example, a user attending a sporting event may broadcast multicast content to mobile devices of other users that are attending the sporting event. In this situation, the relevant MBSFN areas may be the MBSFN areas that cover the venue of the sporting event.

Process 500 may further include scheduling the multicast transmission of the content (block 550). In some implementations, the multicast transmission may be scheduled to occur in real-time, or in near real-time, with the uploading of the content. In an alternative possible implementation, the multicast transmission may be scheduled to occur at some date after the uploading of the content.

Process 500 may further include receiving the content, via unicast, and distributing the content via a multicast transmission (block 560). The content may be uploaded, from a mobile device 210, via unicast transmission. For example, a mobile device 210 may directly transmit the content to BMSC 310, which may proceed to control the multicast transmission of the content, as an eMBMS transmission, to one or more other mobile devices 210. As another example, mobile device 210 may transmit the content to multicast subscriber server 280, which may forward the content to BMSC 310 for the eMBMS transmission. The multicast transmission may be performed by the base stations that are associated with the MBSFN areas that were determined in block 540. The multicast transmission may also be performed based on the broadcast schedule determined in block 550.

In some implementations, the users that have registered, to follow a particular producer of content, may be notified of the availability (e.g., of the initiation of the distribution) of the multicast content (block 570). For example, a text message (or other message) may be sent to the mobile devices of the users to inform the users that the multicast transmission has started. Other information, such as a particular multicast channel associated with the transmission, may also be included with the message. In this manner, followers of a content producer can be alerted when content is available.

Alternatively, or additionally, in some implementations, instead of notifying a user that multicast content is available, mobile devices 210 may be configured to automatically receive and store the multicast content (e.g., without notifying the user). The stored multicast content may then be available for later viewing by the user of the mobile device.

In some implementations, the notifications relating to the distribution of the content may be transmitted as part of the multicast transmission, such as in control channels associated with the multicast transmission. In other implementations, the notifications relating to the distribution of the content may be transmitted out-of-band relative to the multicast transmission, such as via a conventional unicast data connection.

Figure 6A:
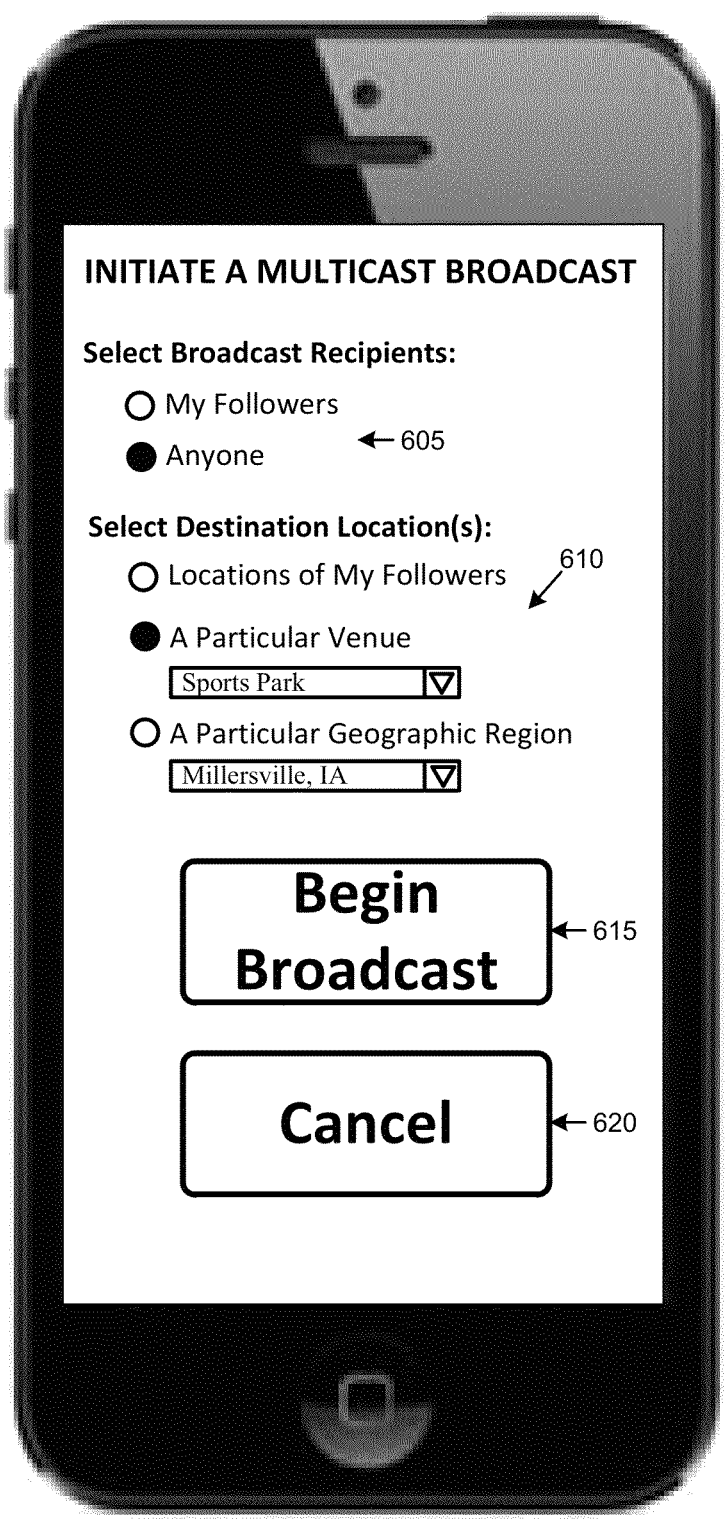
FIGS. 6A and 6B illustrate example user interfaces associated with the providing of user-originated content via multicast.
Figure 6B:
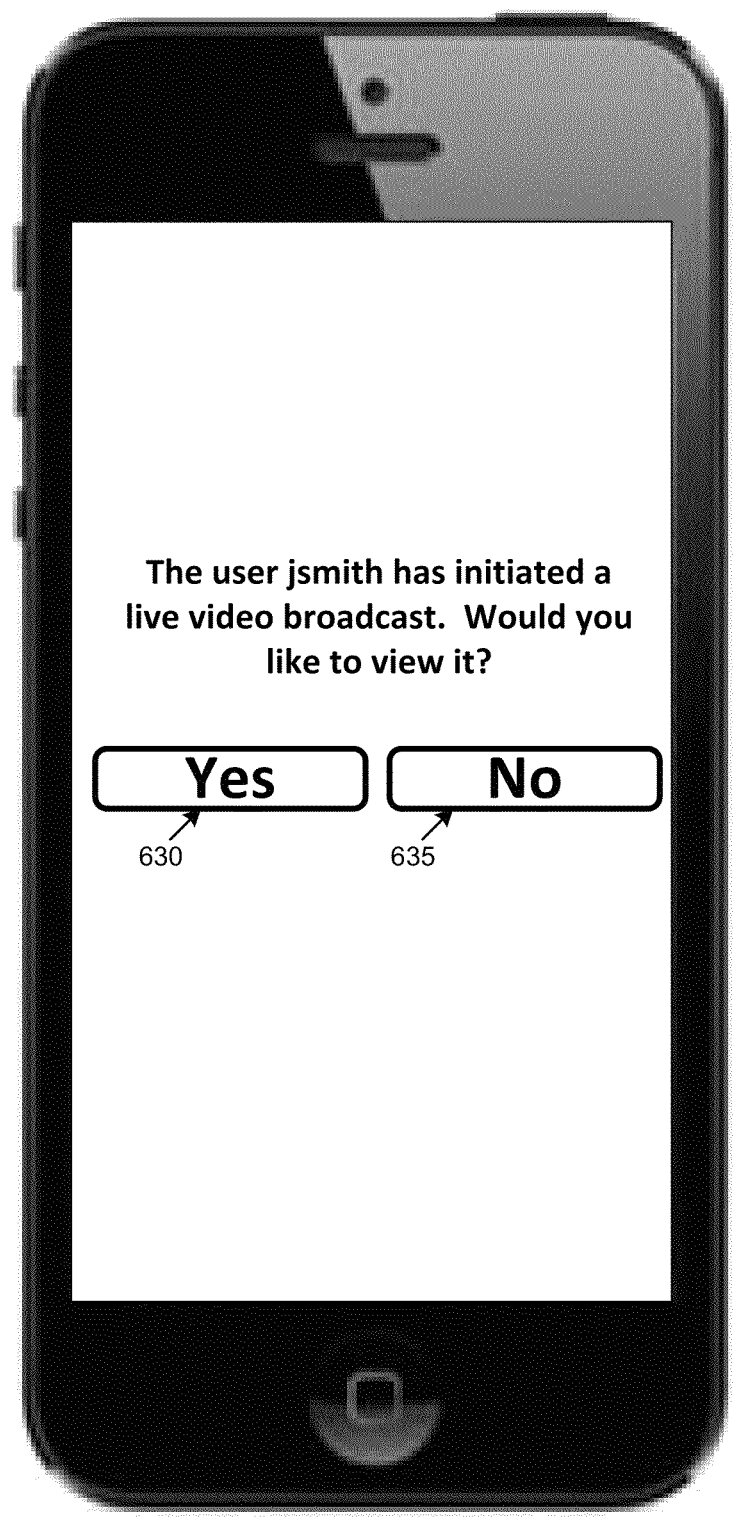

FIGS. 6A and 6B illustrate example user interfaces associated with the providing of user originated content via multicast broadcast. For instance, FIG. 6A illustrates an example user interface that may be displayed, by user device 210, to a user that is initiating the transmission of content via a multicast transmission. The user interface may include a number of options, such as an option to select the users that are eligible to receive and view the content. In the illustrated example, radio selection buttons 605 may provide the user with options such as "My Followers" and "Anyone." Another option illustrated in FIG. 6A is an option allowing the user to select the destination locations for the multicast broadcast. The selected destination locations may be used, by multicast subscriber server 280 or BMSC 310, to determine the base stations 235 or the MBSFN areas that will perform the multicast broadcast. In the illustrated example, radio buttons 610 may provide the user with options such as "Locations of My Followers," option to select a particular venue, or an option to select a particular geographic region. The selection of a particular venue may be performed through a drop-down menu, where the user may be able to select a particular venue, such as a sports park, a hotel, a conference area, etc. The selection of a particular geographic region may be performed through another drop-down menu, where the user may be able to select a particular geographic region, such as a particular town, a particular ZIP Code, etc. After making selections through radio buttons 605 and 610, the user may choose to begin the transmission (e.g., through selection of button 615—Begin Broadcast). Alternatively, the user may cancel the initiation of the multicast transmission (e.g., through selection of button 620—Cancel).

FIG. 6B illustrates an example user interface that may be displayed to notifying a receiving user that a live video transmission has been initiated. As illustrated, the notification may include text such as: "The user jsmith has initiated a live video broadcast. Would you like to view it?" The user interface may include an option to view the live video broadcast (button 630—YES), and an option to decline to view the live video broadcast (button 635—NO).

Figure 7:
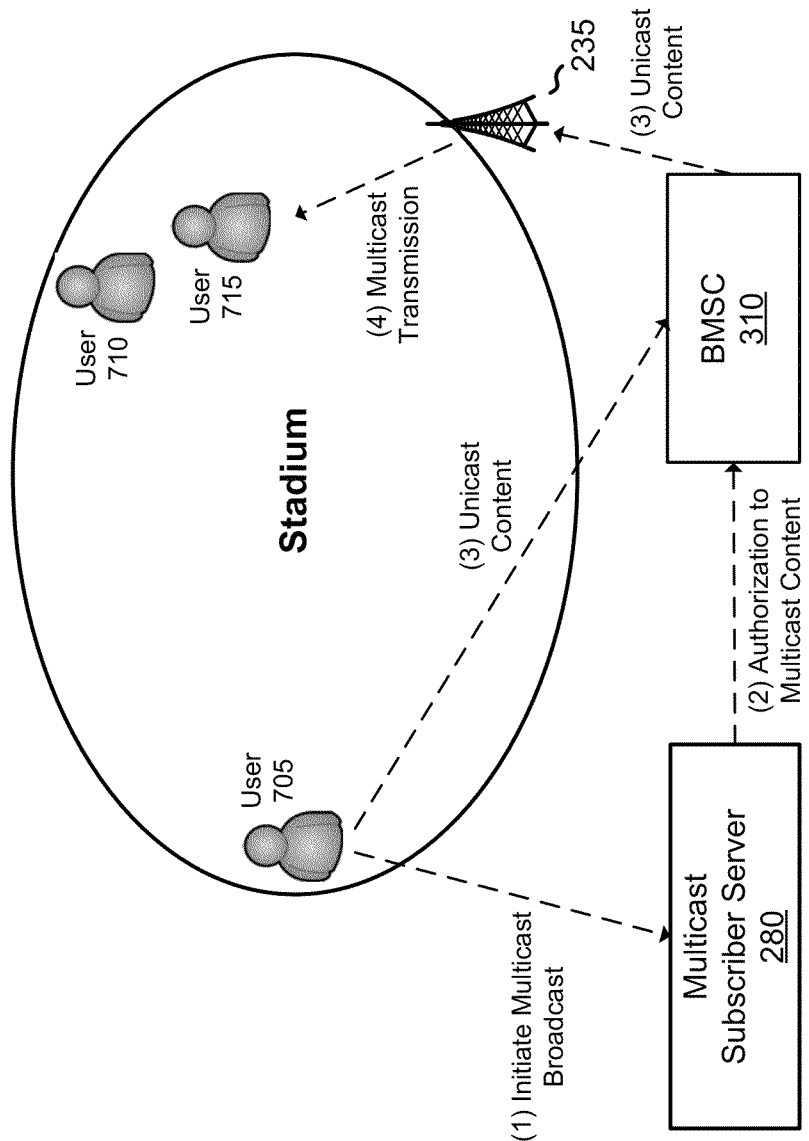
FIG. 7 is a diagram illustrating one particular example, consistent with aspects described herein, of multicast of mobile device originated content.

FIG. 7 is a diagram illustrating one particular example, consistent with aspects described herein, of a multicast broadcast of mobile device-originated content. As illustrated, assume that a first user 705 is attending a sporting event (e.g., a baseball game at a "Stadium") and would like to, using a mobile device, transmit a video stream from his/her vantage point in the stadium. Other users 710 and 715, who may also possess mobile devices, may wish to receive and view the video stream provided by user 705. As an example, user 705 may have captured, in video, a unique view of a homerun that occurred in the baseball game. User 705 may send a request to upload the content (e.g., the video of the homerun), to multicast subscriber server 280 (communication (1), Initiate Multicast Broadcast), for multicast broadcast of the content. User 705 may indicate that the content should be made available to other users in the stadium. In response, multicast subscriber server 280 may authorize user 705. Multicast subscriber server 280 may transmit a message, to BMSC 310, indicating that user 705 is authorized (communication (2), Authorization to Multicast Content) to upload content. In some implementations, and as previously mentioned, the functionality of multicast subscriber server 280 and BMSC 310 may be combined. In this situation, communication (1) may be directly transmitted to BMSC 310.

User 705 may upload the content to BMSC 310 (communication (3), Unicast Content), via a unicast data connection. The content may be distributed, by BMSC 310 and/or by other network elements, to one or more base stations 235 (e.g., eNodeBs) that provide coverage of the stadium. Base stations 235 may distribute the content, via multicast transmission (e.g., using eMBMS), to users 710 and 715 (communication (4), Multicast Transmission). As previously mentioned, the multicast transmission may include a transmission of the content, via a radio interface, which multiple mobile devices (e.g., those associated with users 710 and 715) may be able to receive. In this manner, users 710 and 715 may view the content (e.g., the video of the homerun) from the perspective of user 705. Because the content is transmitted to users 710 and 715 via multicast transmission, the radio bandwidth of base station 235 may be efficiently utilized.

Figure 8:
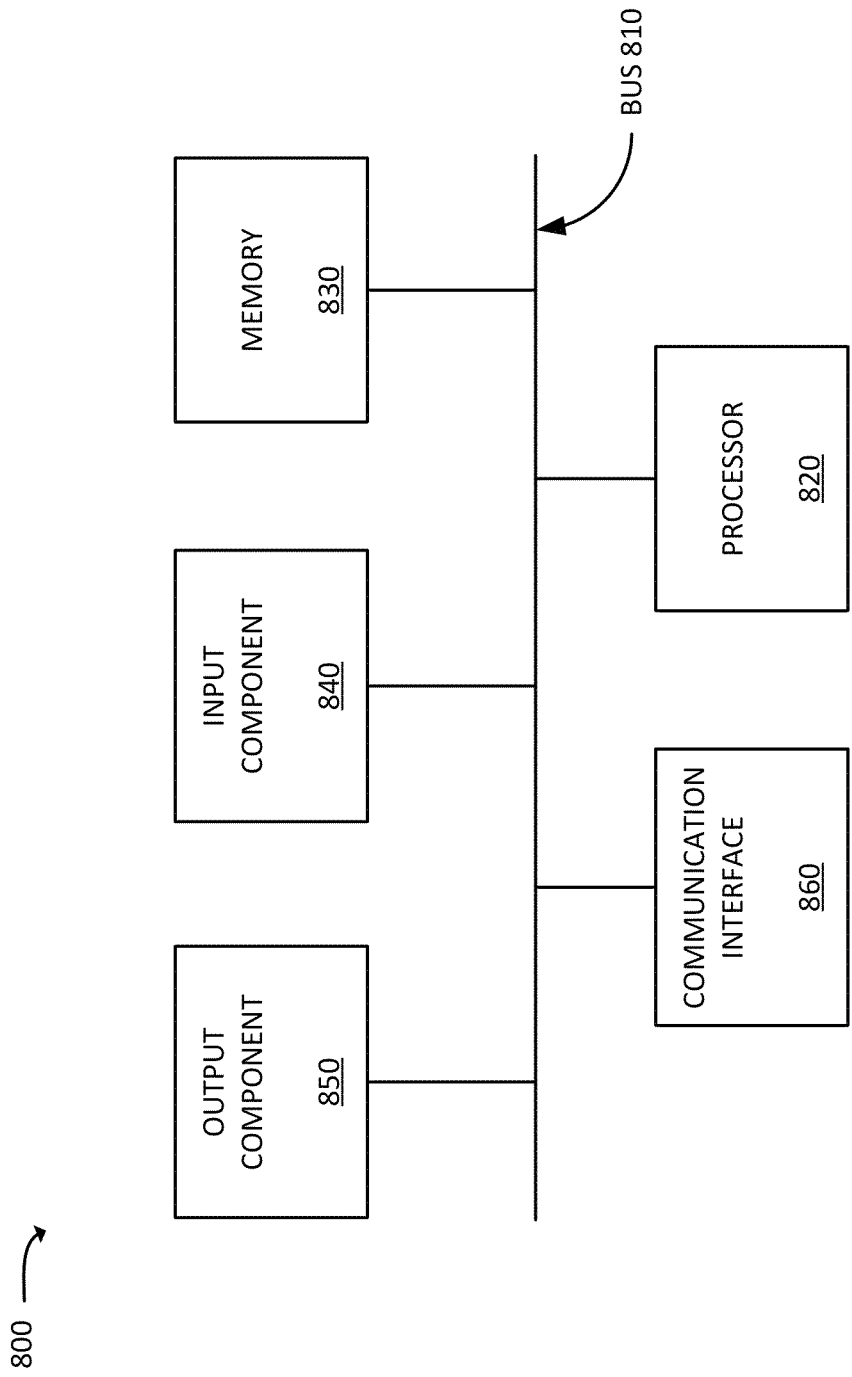
FIG. 8 is a diagram of example components of a device.

FIG. 8 is a diagram of example components of a device 800. Each of the devices described above (e.g., devices illustrated in FIGS. 1-3 and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving, by one or more computing devices and from a mobile device attached to a wireless network, a request to initiate a multicast transmission of content generated by the mobile device;
   receiving, by the one or more computing devices and from the mobile device, information identifying other mobile devices that are intended to receive the content;
   receiving, by the one or more computing devices and from the mobile device, information identifying a particular geographic area, selected by a user of the mobile device, for distributing the multicast transmission of the content;
   determining, by the one or more computing devices, one or more wireless coverage areas, based on the particular geographic area, to which the multicast transmission of the content is to be provided, wherein the determining of the one or more wireless coverage areas to which the multicast transmission of the content is to be provided comprises:

determining a device identifier of the mobile device,
identifying a user name corresponding to a user of the mobile device,
determining followers associated with the user name,
determining mobile devices associated with each of the followers, and
determining the one or more wireless coverage areas based on physical locations, corresponding to the coverage areas, of the mobile devices;
receiving, by the one or more computing devices and from the mobile device, a unicast transmission of the content, wherein the content provided by the mobile device is generated, by the mobile device, as video content; and
distributing, by the one or more computing devices in real-time, the received video content, via one or more multicast data channels that are broadcast in the one or more wireless coverage areas such that the video content is only received by mobile devices that are identified as being intended to receive the content and that are located within the particular geographic area.

2. The method of claim 1, wherein the other mobile devices are identified as being intended to receive the content due to users of the other mobile devices having previously registered to receive content associated with a user of the mobile device.

3. The method of claim 2, further comprising:
transmitting a notification to the mobile devices, the notification including information indicating that the content, provided by the mobile device, is available.

4. The method of claim 2, wherein the determination of the one or more wireless coverage areas further includes:
selecting one or more base stations, associated with the wireless network and with providing service to the particular geographic area, to which the mobile devices are attached, wherein the one or more wireless coverage areas are determined as the coverage areas associated with the selected one or more base stations.

5. The method of claim 1, wherein the determination of the one or more wireless coverage areas further includes:
identifying wireless coverage areas, of the wireless network, that are associated with providing service to the particular geographic area.

6. The method of claim 1, wherein distributing the received content, via the one or more multicast data channels, further includes:
distributing the received content over an enhanced Multimedia Broadcast Multicast Service (eMBMS) provided in a Long Term Evolution (LTE) network.

7. The method of claim 1, further comprising:
authenticating the mobile device as a mobile device that is associated with a user that is registered with a multicast distribution service associated with the wireless network.

8. The method of claim 1, wherein the particular geographic area includes at least one of:
a particular town,
a particular city,
a particular county,
a particular ZIP code, or
a particular venue.

9. A system comprising:
a memory; and
at least one processor to execute instructions in the memory to:
receive, from a mobile device attached to a wireless network, a request to initiate a multicast transmission of content generated by the mobile device;
receive, from the mobile device, information identifying other mobile devices that are intended to receive the content;
receive, from the mobile device, information identifying a particular geographic area, selected by a user of the mobile device, for distributing the multicast transmission of the content;
determine one or more wireless coverage areas, based on the particular geographic area, to which the multicast transmission of the content is to be provided, wherein, to determine the one or more wireless coverage areas to which the multicast transmission of the content is to be provided, the at least one processor is to:
determine a device identifier of the mobile device,
identify a user name corresponding to a user of the mobile device,
determine followers associated with the user name,
determine mobile devices associated with each of the followers, and
determine the one or more wireless coverage areas based on physical locations, corresponding to the coverage areas, of the mobile devices;
receive, from the mobile device, a unicast transmission of the content, wherein the content provided by the mobile device is generated, by the mobile device, as video content; and
distribute the received video content in real-time, via one or more multicast data channels that are broadcast in the one or more wireless coverage areas such that the video content is only received by mobile devices that are identified as being intended to receive the content and that are located within the particular geographic area.

10. The system of claim 9, wherein the other mobile devices are identified as being intended to receive the content due to users of the other mobile devices having previously registered to receive content associated with a user of the mobile device.

11. The system of claim 10, wherein the memory further includes instructions to:
transmit a notification to the mobile devices, the notification including information indicating that the content, provided by the mobile device, is available.

12. The system of claim 10, wherein the memory further includes instructions, when determining the one or more wireless coverage areas, to:
select one or more base stations, associated with the wireless network and with providing service to the particular geographic area, to which the mobile devices are attached, wherein the one or more wireless coverage areas are determined as the coverage areas associated with the selected one or more base stations.

13. The system of claim 9, wherein the memory further includes instructions, when determining the one or more wireless coverage areas, to:
identify wireless coverage areas, of the wireless network, that are associated with providing service to the particular geographic area.

14. The system of claim 9, wherein the memory further includes instructions, when distributing the received content, via the one or more multicast data channels, to:
distribute the received content over an enhanced Multimedia Broadcast Multicast Service (eMBMS) provided in a Long Term Evolution (LTE) network.

15. The system of claim 9, wherein the memory further includes instructions to:

authenticate the mobile device as a mobile device that is associated with a user that is registered with a multicast distribution service associated with the wireless network.

16. The mobile device of claim 9, wherein the particular geographic area includes at least one of:
    a particular town,
    a particular city,
    a particular county,
    a particular ZIP code, or
    a particular venue.

17. A mobile device comprising:
    a memory; and
    at least one processor to execute instructions in the memory to:
        transmit, from the mobile device, which is associated with a user, a request to initiate a multicast transmission of video content to a plurality of users of other mobile devices that have previously registered to receive content from the user;
        transmit, from the mobile device, information identifying other mobile devices that are intended to receive the content;
        transmit, from the mobile device, information identifying a particular geographic area, selected by the user of the mobile device, for distributing the multicast transmission of the content;
        receive authorization for the multicast transmission of the video content;
        capture, by the mobile device, the video content; and
        transmit, via a unicast transmission, the captured video content to a broadcast multicast service center (BMSC) that implements an enhanced Multimedia Broadcast Multicast Service (eMBMS) associated with a wireless network, the BMSC forwarding the captured video content, in real-time, to one or more base stations corresponding to one or more wireless coverage areas, associated with the wireless network and with the particular geographic area, for multicast transmission of the captured video content to the plurality of users of the other mobile devices such that the video content is only received by mobile devices that are identified as being intended to receive the content and that are located within the particular geographic location, the one or more wireless coverage areas being determined by:
        a determination of a device identifier of the mobile device,
        an identification of a user name corresponding to a user of the mobile device,
        a determination of followers associated with the user name,
        a determination of mobile devices associated with each of the followers, and
        a determination of the one or more wireless coverage areas based on physical locations, corresponding to the wireless coverages areas, of the mobile devices.

18. The method of claim 17, wherein the mobile device is attached to the wireless network.

19. The method of claim 17, wherein the wireless network includes a Long Term Evolution (LTE) wireless network.

20. The system of claim 17, wherein the particular geographic area includes at least one of:
    a particular town,
    a particular city,
    a particular county,
    a particular ZIP code, or
    a particular venue.

* * * * *